United States Patent [19]

Popovich

[11] Patent Number: 5,677,972
[45] Date of Patent: Oct. 14, 1997

[54] HIGH EFFICIENCY DIRECT COUPLING OF RADIANT ELECTROMAGNETIC ENERGY INTO DIELECTRIC WAVE GUIDE STRUCTURE

[75] Inventor: John M. Popovich, Del Mar, Calif.

[73] Assignee: TIR Technologies, Inc., Carson City, Nev.

[21] Appl. No.: 593,149

[22] Filed: Feb. 21, 1996

[51] Int. Cl.$^6$ .................. G02B 6/26; G02B 6/42
[52] U.S. Cl. .................. 385/31
[58] Field of Search .............. 385/31, 123; 250/227, 250/227.11, 227.14, 227.24; 369/44, 45, 46

[56] References Cited

U.S. PATENT DOCUMENTS

| | | | |
|---|---|---|---|
| 1,421,506 | 7/1922 | Limpert | 385/147 |
| 3,915,148 | 10/1975 | Fletcher et al. | 359/742 |
| 3,941,993 | 3/1976 | Hubert | 362/309 |
| 3,970,070 | 7/1976 | Meyer et al. | 126/645 |
| 4,002,031 | 1/1977 | Bell | 126/698 |
| 4,022,186 | 5/1977 | Northrup, Jr. | 359/726 |
| 4,074,704 | 2/1978 | Gellert | 359/726 |
| 4,103,673 | 8/1978 | Woodworth et al. | 359/742 |
| 4,108,540 | 8/1978 | Anderson et al. | 359/726 |
| 4,116,223 | 9/1978 | Vasilantone | 359/743 |
| 4,124,017 | 11/1978 | Paull | 126/652 |
| 4,136,670 | 1/1979 | Davis | 126/584 |
| 4,171,695 | 10/1979 | Sletten | 359/727 |
| 4,194,949 | 3/1980 | Stark | 126/634 |
| 4,268,116 | 5/1981 | Schmadel et al. | 385/1 |
| 4,337,759 | 7/1982 | Popovich et al. | 126/684 |
| 4,755,921 | 7/1988 | Nelson | 362/309 |
| 5,037,172 | 8/1991 | Hekman et al. | 385/31 |
| 5,150,966 | 9/1992 | Nelson | 362/337 |
| 5,404,869 | 4/1995 | Parkyn, Jr. et al. | 359/642 |

FOREIGN PATENT DOCUMENTS

| | | | |
|---|---|---|---|
| 0084907 | 6/1980 | Japan | 385/31 |
| 01312201 | 5/1990 | Japan | 385/31 |
| 1325086 | 8/1973 | United Kingdom . | |
| 1325087 | 8/1973 | United Kingdom . | |
| 1546791 | 5/1979 | United Kingdom . | |
| 1546792 | 5/1979 | United Kingdom . | |
| 1546793 | 5/1979 | United Kingdom . | |
| 1557472 | 12/1979 | United Kingdom . | |
| 1561129 | 2/1980 | United Kingdom . | |
| 2239939 | 1/1993 | United Kingdom . | |
| 2239940 | 12/1993 | United Kingdom . | |

*Primary Examiner*—Akm E. Ullah
*Attorney, Agent, or Firm*—William W. Haefliger

[57] ABSTRACT

Radiant electromagnetic energy transmitting apparatus, comprising an elongated rod consisting of electromagnetic energy transmitting material, and a source of the energy having an end portion received into the rod to transmit the energy in different directions therein for effecting energy travel lengthwise of the rod.

12 Claims, 2 Drawing Sheets

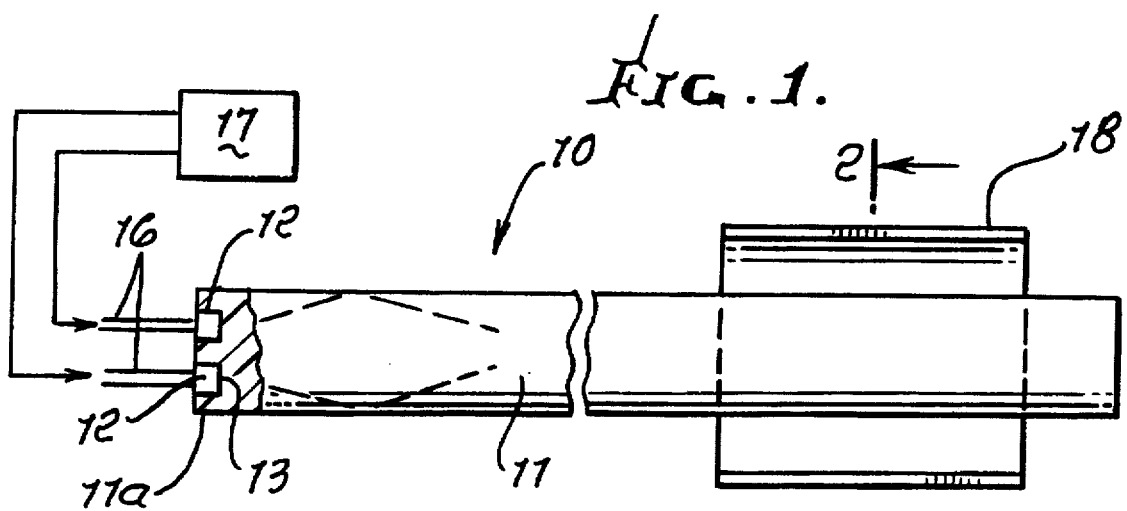
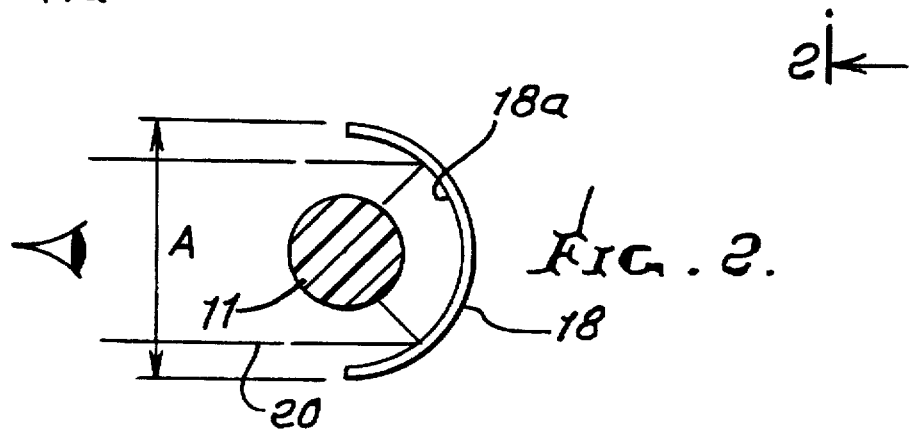
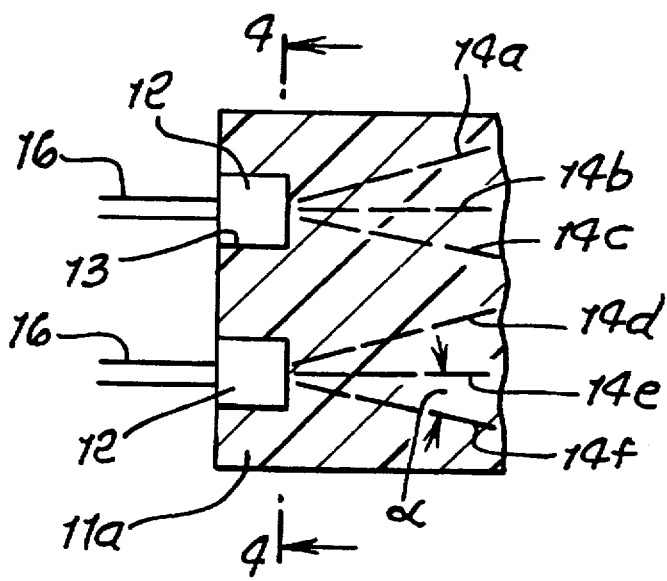
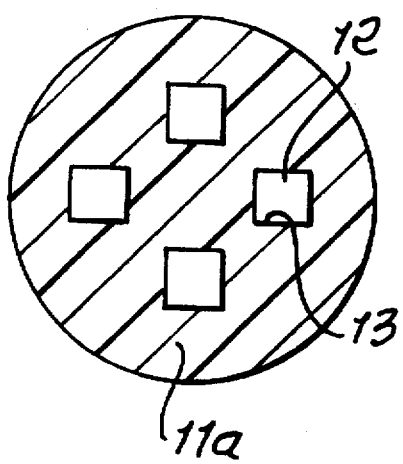

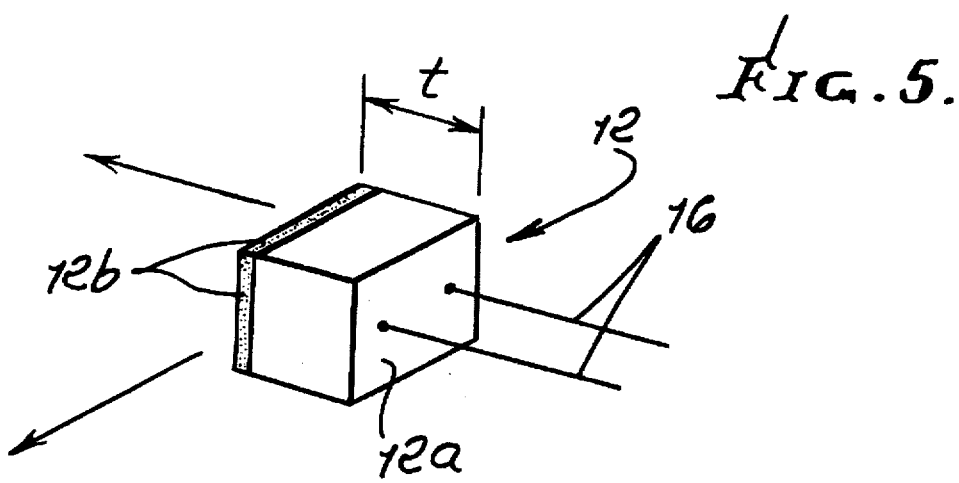
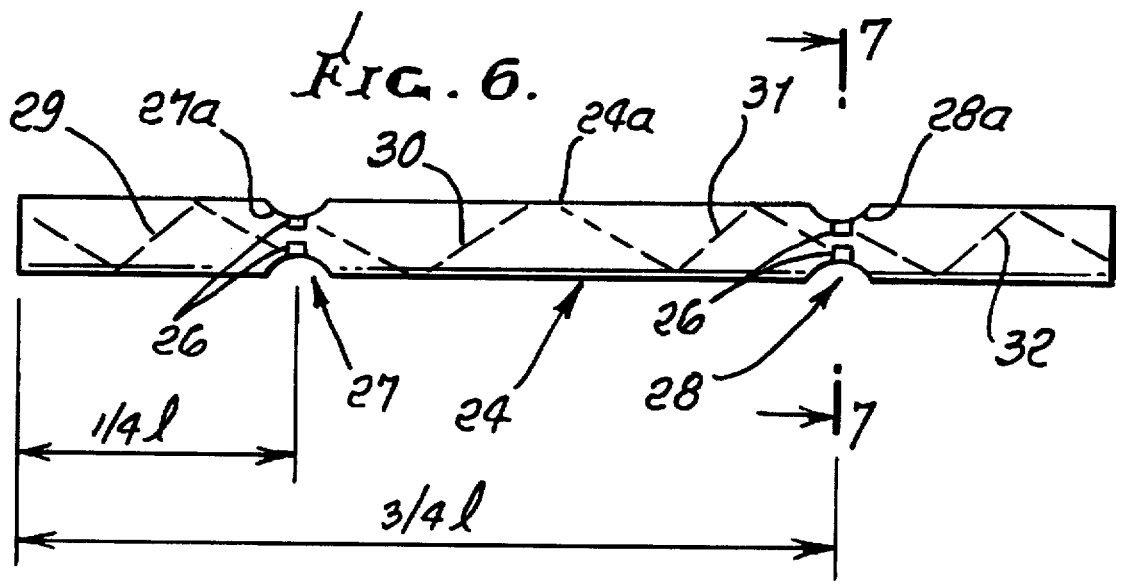
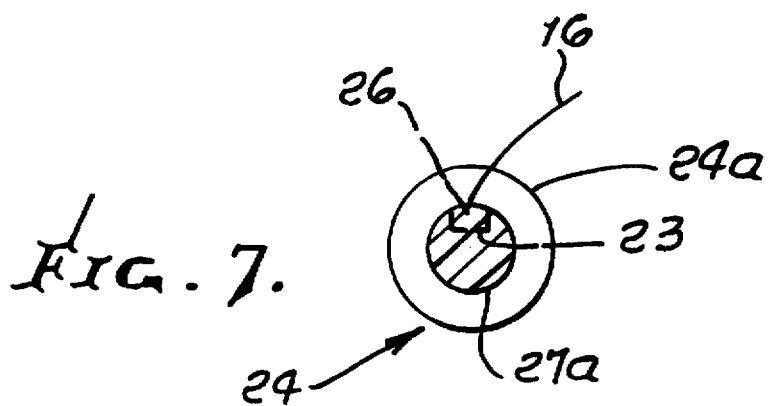

HIGH EFFICIENCY DIRECT COUPLING OF RADIANT ELECTROMAGNETIC ENERGY INTO DIELECTRIC WAVE GUIDE STRUCTURE

BACKGROUND OF THE INVENTION

This invention relates generally to coupling of radiant electromagnetic energy into solid dielectric wave guide structure, and more particularly to efficient coupling of light from light sources into light transmitting media for travel therein.

There is need for simple, efficient coupling of electromagnetic energy, such as light from LEDs, into solid wave guide structures such as rods, slabs and etc. Apparatus of this type can be formed into many shapes for a large number of uses, one example being lighting conformed to or fitting external or internal locations on vehicles, and in or on buildings, or displays of many types.

SUMMARY OF THE INVENTION

It is a major object of the invention to provide simple, efficient and rugged apparatus meeting the above need.

Basically, the radiant electrical energy transmitting apparatus of the invention comprises:

a) an elongated element consisting of electromagnetic energy transmitting material, b) and a source of such energy having an end portion received into the element to transmit energy in different directions therein for effecting energy travel lengthwise.

As will appear, the element such as a rod or wave guide may consist of light transmissive material which is bendable to desired shape, and the light source end portion, such as an LED, is advantageously and protectively received in a recess in the wave guide, or embedded in the latter. In this regard the rod or wave guide may consist of synthetic polymeric material.

Another object is to provide the light source receiving recess at an end portion of the rod or wave guide, or sidewardly at a location along its length. Multiple such recesses may be provided, for reception of multiple light sources, such as LEDs.

Yet another object is to provide rod opposite side wall extents which are relatively convergent at the recess location. Such a rod or wave guide may, for example, have reduced cross-sectional area at or proximate such locations. Such locations may be provided at or proximate to ¼ and/or ¾ "l", along rod length "l", for efficient light coupling into the rod.

A further object is to efficiently couple LEDs to a synthetic resinous, light transmitting rod or rods.

These and other objects and advantages of the invention, as well as the details of an illustrative embodiment, will be more fully understood from the following specification and drawings, in which:

DRAWING DESCRIPTION

FIG. 1 is an elevation showing one preferred form of apparatus incorporating the invention;

FIG. 2 is an elevation taken in section on lines 2—2 of FIG. 1;

FIG. 3 is an enlarged section taken in elevation through one end of a light transmitting rod, showing LED embedding;

FIG. 4 is an elevation taken in section on lines 4—4 of FIG. 3;

FIG. 5 is an enlarged perspective view showing an LED of the type used in FIGS. 1–4;

FIG. 6 is a view like FIG. 1, but showing light sources embedded in reduced cross sectional zones along a light transmitting rod; and FIG. 7 is an enlarged section taken on lines 7—7 of FIG. 6.

DETAILED DESCRIPTION

Referring first to FIGS. 1–4, radiant energy transmitting apparatus is indicated generally at 10, such energy for example consisting of light, as in the visible wave length zone of the spectrum. The apparatus includes an elongated wave guide such as a rod 11 consisting of electromagnetic energy transmitting material, and a source or sources of such energy, each having an end portion recessed into the rod to transmit energy in a preferred direction, for effecting energy travel lengthwise of (i.e. along) the rod. See for example the LEDs 12 received in recesses 13 in the end portion 11a of the rod, so that the LEDs are effectively embedded in the rod end portion. Light from the LEDs is shown being transmitted in different directions 14a–14f, over a range of angles, these showings being illustrative only. A large portion of such light is typically (i.e. within cone of angle) transmitted as rays extending at angles such as to enable successive total internal reflections off the boundary or periphery of the rod, along its length, for travel lengthwise along and internally of the rod. As shown, the LEDs may be completely embedded, along their lengths in the rod end portion, and may have tight wall-to-wall fits in the recesses 13. LED terminals appear at 16, and a low voltage source 17 is schematically shown or connected with such terminals, in FIG. 1. The rod typically consists of synthetic polymeric material, and may be flexible so as to be bendable. The rod may be considered as a "wave guide", i.e. to guide the light waves for transmission lengthwise of the rod. Usable synthetic polymer include polymers of silicone, urethane, epoxy, polyamid, acrylic, polyesters and others. Glasses are usable. These are transparent.

FIGS. 1 and 2 also show a reflector 18 located at one side of the rod. Light emanating from the rod is reflected, as for example as shown by rays 20 reflected from the interior curved surface 18a of the reflector. The reflector may take the form of discreet light scattering dots, with varying spacing to provide uniformity of collimated light reflection as viewed from the aperture A.

FIG. 5 shows one form of LED 12 having a cube shape, with terminals 16 projecting from the end wall 12a. Light generated by the LED emanates from different walls such as all five remaining walls 12b. Recesses 13 in the rod may have cube shape for embedding such LEDs, with tight fits. A typical cube dimension t is 0.01 inch.

In the form of the invention shown in FIGS. 6 and 7, the light source receiving recess is formed sidewardly into the rod at a location along the rod length. See recesses 23 which are spaced inwardly of the cylinder formed outer surface 24a of rod 24. Light sources such as LEDs embedded in such recesses appear at 26. Preferably, the rod is "necked down" at recess general locations 27 and 28 along the rod length, and has narrowed or venturi shape at such locations. The recesses are formed in rod side wall extents 27a and 28a which are axially tapered or relatively convergent, as shown, whereby the LEDs in such recesses are well positioned to transmit light lengthwise of the rod, as indicated by broken line rays 29, 30, 31 and 32 extending from the LEDs and traveling along and internally of the "wave guide" rod. Maximum light transmission throughout the rod is effected if locations 27 and 28 are at ¼ l and ¾ l, where l is the rod overall length, as shown.

Radiation may be caused to exit the wave guide by a variety of means, including surface roughness to cause frustrated total internal reflection, the addition of bulk scattering agents to generate radiation outside the T.I.R. envelope, shape modifications such as reducing cross-sectional area, and form changes such as overall curving of the wave guide.

I claim:

1. Radiant electromagnetic energy transmitting apparatus, comprising
   a) an elongated rod consisting of electromagnetic energy transmitting material,
   b) and a source of said energy having an end portion received into said rod to transmit said energy in different directions therein for effecting energy travel lengthwise of the rod,
   c) said energy source comprising multiple LEDs embedded into a portion of the rod and spaced at substantially equal angular intervals about the center of the rod, said LEDs offset from said center.

2. The combination of claim 1 wherein said rod material consists of light transmitting synthetic resin.

3. The combination of claim 1 wherein said rod defines multiple recesses, and said LEDS are received into said recesses.

4. The combination of claim 3 wherein said recesses are spaced apart along the rod.

5. The combination of claim 4 wherein the rod has opposite side wall extents which are relatively convergent at said recess locations.

6. The combination of claim 5 wherein the rod is narrowed at and proximate said locations.

7. The combination of claim 4 wherein said rod has length "l", and said recesses are located at or proximate to ¼ "l" and ¾ "l", along the rod length.

8. The combination of claim 7 wherein the rod has opposite side wall extents which are relatively convergent at said recess locations.

9. The combination of claim 1 wherein said LEDS have cube shape.

10. The combination of claim 1 wherein said light source comprise multiple LEDs embedded into the rod.

11. The combination of claim 1 including an electromagnetic energy reflection means facing said rod, sidewise thereof.

12. The combination of claim 11 wherein said reflector means is a light reflector means characterized as providing substantial uniformity of collimated light reflection.

* * * * *